US00RE35042E

United States Patent [19]

Anderson, III, et al.

[11] E Patent Number: Re. 35,042

[45] Reissued Date of Patent: Sep. 26, 1995

[54] AMORPHOUS ANTIPILFERAGE MARKER

[75] Inventors: Philip M. Anderson, III, Madison; Ryusuke Hasegawa, Morristown; Robert M. VonHoene, Basking Ridge, all of N.J.

[73] Assignee: Allied Corporation, Morris Township, Morris County, N.J.

[21] Appl. No.: 51,588

[22] Filed: Apr. 22, 1993

Related U.S. Patent Documents

Reissue of:

[64] Patent No.: 4,553,136
Issued: Nov. 12, 1985
Appl. No.: 463,743
Filed: Feb. 4, 1983

U.S. Applications:

[63] Continuation of Ser. No. 841,221, Feb. 18, 1992, abandoned, which is a continuation of Ser. No. 659, 485, Feb. 25, 1991, abandoned, which is a continuation of Ser. No. 534,002, Jun. 5, 1990, abandoned, which is a continuation of Ser. No. 434,603, Nov. 8, 1989, abandoned, which is a continuation of Ser. No. 327,486, Mar. 22, 1989, abandoned.

[51] Int. Cl.[6] ..... G08B 13/26

[52] U.S. Cl. ..... 340/572; 235/493

[58] Field of Search ..... 340/551, 572; 235/493

[56] References Cited

U.S. PATENT DOCUMENTS

| | | | |
|---|---|---|---|
| Re. 32,427 | 5/1987 | Gregor et al. | 340/572 |
| Re. 32,428 | 5/1987 | Gregor et al. | 340/572 |
| 3,856,513 | 12/1974 | Chen et al. | 75/122 |
| 4,074,249 | 2/1978 | Minasy | 340/572 |
| 4,075,618 | 2/1978 | Montean | 340/280 |
| 4,126,287 | 11/1978 | Mendelsohn et al. | 245/8 |
| 4,298,862 | 11/1981 | Gregor et al. | 340/572 |

FOREIGN PATENT DOCUMENTS

| | | |
|---|---|---|
| 17801 | 10/1980 | European Pat. Off. . |
| 3021536 | 12/1980 | European Pat. Off. . |
| 21101 | 1/1981 | European Pat. Off. . |
| 763681 | 2/1934 | France . |
| 2835389 | 3/1979 | Germany . |

OTHER PUBLICATIONS

Egami, T. et al. Amorphous Alloys as Soft Magnetic Materials, Publication of Univ. of Penn. 1975, 17 pages.

Luborsky, F. E. et al., Magnetic Annealing of Amorphous Alloys, IEEE Transactions, vol. MAG-11, No. 6, Nov. 1975, pp. 1644–1649.

Sellers, G. J., Metglas Alloys: An Answer . . . Shielding, IEEE publication, 1977, 4 pages.

*Primary Examiner*—Thomas P. Noland

*Attorney, Agent, or Firm*—Ernest D. Buff; Melanie L. Brown

[57] ABSTRACT

A magnetic theft detection system marker is adapted to generate magnetic fields at frequencies that (1) are harmonically related to an incident magnetic field applied within an interrogation zone and (2) have selected tones that provide the marker with signal identity. The marker is an elongated, ductile strip of amorphous ferromagnetic material having a value of magnetostriction near zero that retains its signal identity under stress.

11 Claims, 2 Drawing Sheets

AMORPHOUS ANTIPILFERAGE MARKER

Matter enclosed in heavy brackets [ ] appears in the original patent but forms no part of this reissue specification; matter printed in italics indicates the additions made by reissue.

*This application is a continuation of Ser. No. 841,221 filed Feb. 28, 1992 (now abandoned) which is a continuation of Ser. No. 659,485 filed Feb. 25, 1991 (now abandoned) which is a continuation of Ser. No. 534,002 filed Jun. 5, 1990 (now abandoned) which is a continuation of Ser. No. 434, 603 filed Nov. 8, 1989 (now abandoned) which is a continuation of Ser. No. 327,486 filed Mar. 22, 1989 (now abandoned) as an application for Reissue of U.S. Pat. No. 4,553,136 issued Nov. 12, 1985 which was filed as original application Ser. No. 06/463,743 on Feb. 4, 1983.*

BACKGROUND OF THE INVENTION

1. Field of the Invention

This invention relates to antipilferage systems and markers for use therein. More particularly, the invention provides a ductile, amorphous metal marker that enhances the sensitivity and reliability of the antipilferage system.

2. Description of the Prior Art

Theft of articles such as books, wearing apparel, appliances and the like from retail stores and state-funded institutions is a serious problem. The cost or replacing stolen articles and the impairment of services rendered by institutions such as libraries exceeds $6 billion annually and is increasing.

Systems employed to prevent theft of articles generally comprise a marker element secured to an object to be detected and instruments adapted to sense a signal produced by the marker upon passage thereof through an interrogation zone.

One of the major problems with such theft detection systems is the difficulty of preventing degradation of the marker signal. If the marker is broken or bent, the signal can be lost or altered in a manner that impairs its identifying characteristics. Such bending or breaking of the marker can occur inadvertently during manufacture of the marker and subsequent handling of merchandise by employees and customers, or purposely in connection with attempted theft of goods. Moreover, the surface of an object to be protected is sometimes so nonlinear that the marker secured thereto assumes and remains in a bent or flexed condition, impairing its identifying signal characteristics. The present invention is directed to overcoming the foregoing problems.

SUMMARY OF THE INVENTION

Briefly stated, the invention provides an amorphous ferromagnetic metal marker capable of producing identifying signal characteristics in the presence of an applied magnetic field. The marker resists breaking during manufacture and handling of merchandise to which it is secured and retains its signal identity under stress.

More specifically, the marker comprises an elongated, ductile strip of amorphous ferromagnetic material having a value of magnetostriction near zero. Such near-zero magnetostrictive amorphous ferromagnetic material is especially suited for use in the marker, as it permits a marker that is bent or flexed to retain substantially its entire signal during the bent or flexed condition. The near-zero magnetostrictive material of which the marker is comprised has a composition consisting essentially of the formula $$Co_aFe_bNi_cX_dB_eSi_f$$

where X is at least one of Cr, Mo and Nb a–f are in atom percent and the following provisos are applicable:

(i) when $14 \leqq (e+f) \leqq 17$, with $10 \leqq e \leqq 17$ and $0 \leqq f \leqq 7$, then (a) if $2 \leqq d \leqq 4$, the values for a, b and c are grouped as follows,

| | |
|---|---|
| $0 \leqq c \leqq 10$ | $10 \leqq c \leqq 30$ |

if $4 \leqq d \leqq 6$, the values for a, b and c are grouped as follows,

| | | |
|---|---|---|
| $57 \leqq a \leqq 87$ | or | $41 \leqq a \leqq 62$ |
| $0 \leqq b \leqq 10$ | | $10 \leqq b \leqq 16$ |
| $0 \leqq c \leqq 10$ | | $10 \leqq c \leqq 20$ |

(c) if $6 \leqq d \leqq 8$, the values for a, b and c are grouped as follows,

| | | |
|---|---|---|
| $61 \leqq a \leqq 80$ | or | $46 \leqq a \leqq 66$ |
| $0 \leqq b \leqq 10$ | | $10 \leqq b \leqq 14$ |
| $0 \leqq c \leqq 4$ | | $4 \leqq c \leqq 15$ |

(ii) when $17 \leqq (e+f) \leqq 20$, with $12 \leqq e \leqq 20$ and $0 \leqq f \leqq 8$, then (a) if $0 \leqq d \leqq 2$, the values for a, b and c are grouped as follows,

| | | |
|---|---|---|
| $58 \leqq a \leqq 83$ | or | $30 \leqq a \leqq 63$ |
| $0 \leqq b \leqq 10$ | | $10 \leqq b \leqq 17$ |
| $0 \leqq c \leqq 10$ | | $10 \leqq c \leqq 38$ |

(b) if $2 \leqq d \leqq 4$, the values for a, b and c are grouped as follows,

| | | |
|---|---|---|
| $56 \leqq a \leqq 81$ | or | $41 \leqq a \leqq 61$ |
| $0 \leqq b \leqq 10$ | | $10 \leqq b \leqq 15$ |
| $0 \leqq c \leqq 10$ | | $10 \leqq c \leqq 20$ |

(c) if $4 \leqq d \leqq 6$, the values for a, b and c are grouped as follows,

| | | |
|---|---|---|
| $59 \leqq a \leqq 79$ | or | $51 \leqq a \leqq 64$ |
| $0 \leqq b \leqq 10$ | | $10 \leqq b \leqq 13$ |
| $0 \leqq c \leqq 5$ | | $5 \leqq c \leqq 10$ |

(iii) when $20 \leqq (e+f) \leqq 23$, with $8 \leqq e \leqq 23$ and $0 \leqq f \leqq 15$, then (a) if $0 \leqq d \leqq 2$, the values for a, b and c are grouped as follows,

| | | |
|---|---|---|
| $55 \leqq a \leqq 78$ | or | $40 \leqq a \leqq 58$ |
| $0 \leqq b \leqq 10$ | | $10 \leqq b \leqq 15$ |
| $0 \leqq c \leqq 10$ | | $10 \leqq c \leqq 20$ |

(b) if $2 \leqq d \leqq 4$, the values for a, b and c are grouped as follows,

| | | |
|---|---|---|
| $57 \leqq a \leqq 76$ | or | $45 \leqq a \leqq 60$ |
| $0 \leqq b \leqq 10$ | | $10 \leqq b \leqq 13$ |
| $0 \leqq c \leqq 6$ | | $6 \leqq c \leqq 15$ |

(iv) when $23 \leqq (e+f) \leqq 26$, with $5 \leqq$ [c]$e \leqq 26$ and $0 \leqq f \leqq 20$, then (a) if $0 \leqq d \leqq 2$, the values for a, b and c are grouped as follows, $54 \leqq a \leqq 75$ $0 \leqq b \leqq 10$ $0 \leqq c \leqq 8$ (v) up to 6 atom percent of the Ni and X component present being, optionally, replaced by Mn; and (vi) up to 2 atom percent of the combined B and Si present being, optionally, replaced by at least one of C, Ge and Al.

The marker resists breaking during manufacture and handling of merchandise to which it is secured, and retains its signal identity in the flexed or bent condition.

In addition, the invention provides a magnetic detection system responsive to the presence within an interrogation zone of an article to which the marker is secured. The system has means for defining an interrogation zone. Means are provided for generating a magnetic field within the interrogation zone. An amorphous magnetic metal marker is secured to an article appointed for passage through the interrogation zone. The marker comprises an elongated, ductile strip of amorphous ferromagnetic metal having a value of magnetostriction near zero and a composition consisting essentially of the formula given above. The marker is capable of producing magnetic fields at frequencies which are harmonics of the frequency of an incident field. Such frequencies have selected tones that provide the marker with signal identity. A detecting means is arranged to detect magnetic field variations at selected tones of the harmonics produced in the vicinity of the interrogation zone by the presence of the marker therewithin. The marker retains its signal identity while being flexed or bent. As a result, the theft detection system of the present invention is more reliable in operation than systems wherein signal degradation is effected by bending or flexing of the marker.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

Figure 1:
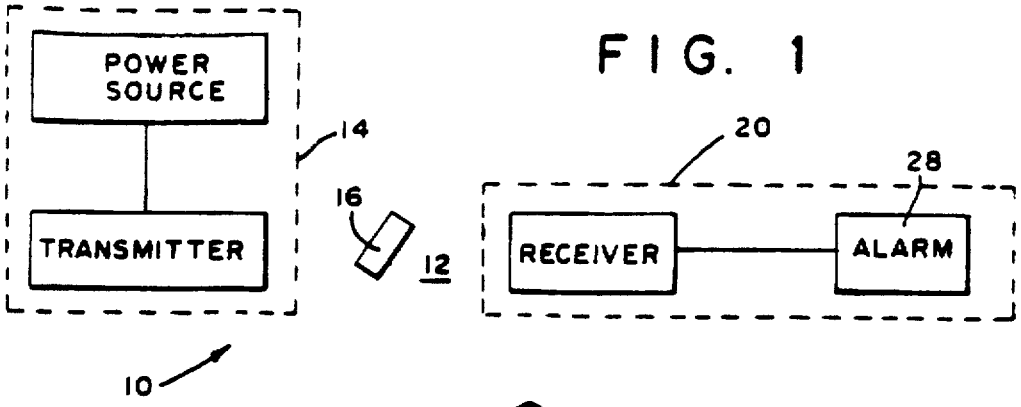
FIG. 1 is a block diagram of a magnetic theft detection system incorporating the present invention.
Figure 2:
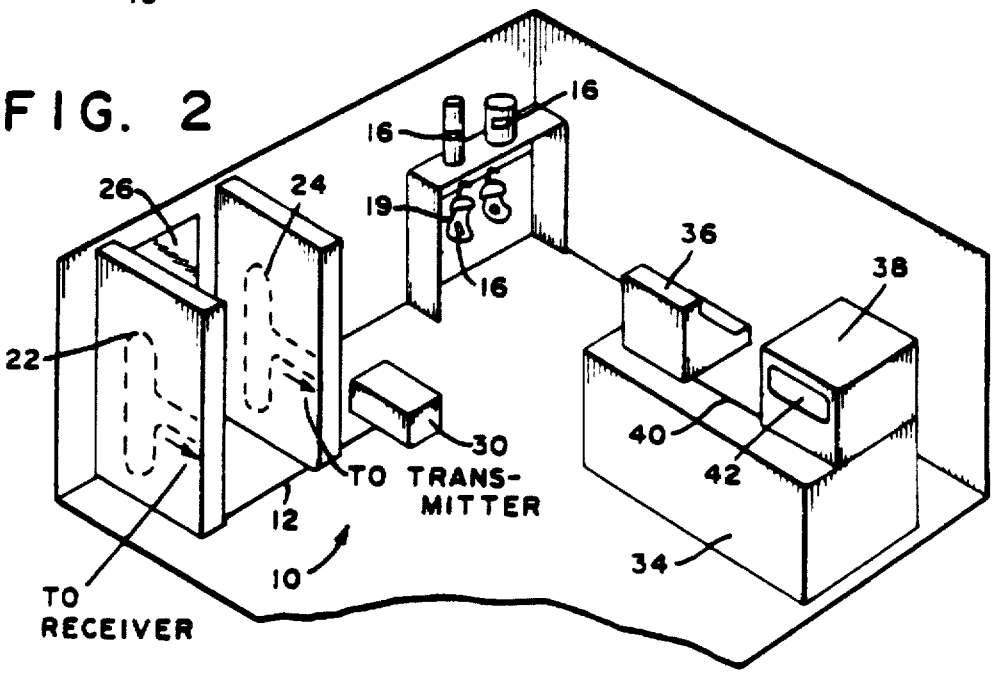
FIG. 2 is a diagrammatic illustration of a typical store installation of the system of FIG. 1.
Figure 3:
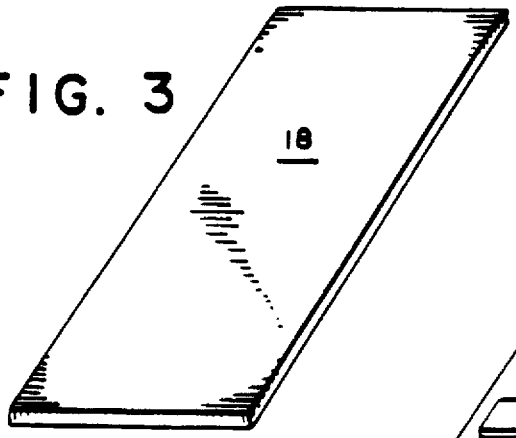
FIG. 3 is an isomeric view of a marker adapted for use in the system of FIG. 1.
Figure 4:
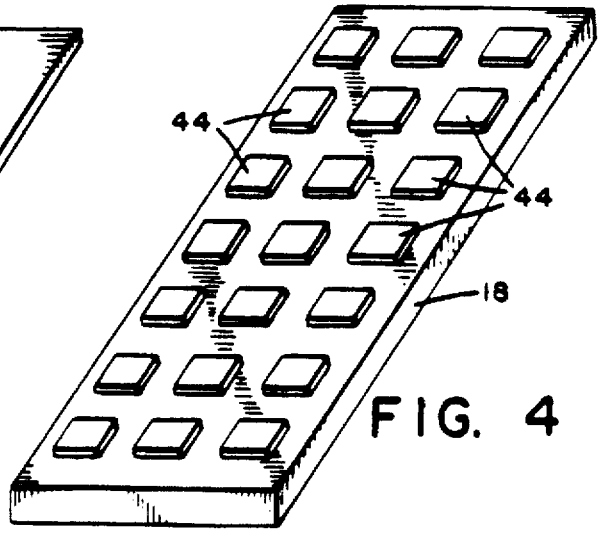
FIG. 4 is an isomeric view of a desensitizable marker adapted for use in the system of FIG. 1.

Referring to FIGS. 1 and 2 of the drawings, there is shown a magnetic theft detection system 10 responsive to the presence of an article within an interrogation zone. The system 10 has means for defining an interrogation zone 12. A field generating means 14 is provided for generating a magnetic field within the interrogation zone 12. A marker 16 is secured to an article 19 appointed for passage through the interrogation zone 12. The marker comprises an elongated, ductile strip 18 of amorphous, ferromagnetic metal having a value of magnetostriction near zero. Strip 18 is composed of material having a composition defined essenttally by the formula $$Co_aFe_bNi_cX_dB_eSi_f$$

where X is at least one of Cr, Mo and Nb a–f are in atom percent and the following provisos are applicable:

(i) when $14 \leqq (e+f) \leqq 17$, with $10 \leqq e \leqq 17$ and $0 \leqq f \leqq 7$, then (a) if $2 \leqq d \leqq 4$, the values for a, b and c are grouped as follows,

| | | |
|---|---|---|
| $44 \leqq a \leqq 84$ | or | $31 \leqq a \leqq 64$ |
| $0 \leqq b \leqq 10$ | | $10 \leqq b \leqq 18$ |
| $0 \leqq c \leqq 10$ | | $10 \leqq c \leqq 30$ |

(b) if $4 \leqq d \leqq 6$, the values for a, b and c are grouped as follows,

| | | |
|---|---|---|
| $57 \leqq a \leqq 87$ | or | $41 \leqq a \leqq 62$ |
| $0 \leqq b \leqq 10$ | | $10 \leqq b \leqq 16$ |
| $0 \leqq c \leqq 10$ | | $10 \leqq c \leqq 20$ |

(c) if $6 \leqq d \leqq 8$, the values for a, b and c grouped as follows,

| | | |
|---|---|---|
| $61 \leqq a \leqq 80$ | or | $46 \leqq a \leqq 66$ |
| $0 \leqq b \leqq 10$ | | $10 \leqq b \leqq 14$ |
| $0 \leqq c \leqq 4$ | | $4 \leqq c \leqq 15$ |

(ii) when $17 \leqq (e+f) \leqq 20$, with $12 \leqq e \leqq 20$ and $0 \leqq f \leqq 8$, then (a) if $0 \leqq d \leqq 2$, the values for a, b and c are grouped as follows,

| | | |
|---|---|---|
| $58 \leqq a \leqq 83$ | or | $30 \leqq a \leqq 63$ |
| $0 \leqq b \leqq 10$ | | $10 \leqq b \leqq 17$ |
| $0 \leqq c \leqq 10$ | | $10 \leqq c \leqq 38$ |

(b) if $2 \leqq d \leqq 4$, the values for a, b and c are grouped as follows,

| | | |
|---|---|---|
| $56 \leqq a \leqq 81$ | or | $41 \leqq a \leqq 61$ |
| $0 \leqq b \leqq 10$ | | $10 \leqq b \leqq 15$ |
| $0 \leqq c \leqq 10$ | | $10 \leqq c \leqq 20$ |

(c) if $4 \leqq d \leqq 6$, the values for a, b and c are grouped as follows,

| | | |
|---|---|---|
| 59 ≦ a ≦ 79 | or | 51 ≦ a ≦ 64 |
| 0 ≦ b ≦ 10 | | 10 ≦ b ≦ 13 |
| 0 ≦ c ≦ 5 | | 5 ≦ c ≦ 10 |

(iii) when 20≦(e+f)≦23, with 8≦e≦23 and 0≦f≦15, then (a) if 0≦d≦2, the values for a, b and c are grouped as follows,

| | | |
|---|---|---|
| 55 ≦ a ≦ 78 | or | 40 ≦ a ≦ 58 |
| 0 ≦ b ≦ 10 | | 10 ≦ b ≦ 15 |
| 0 ≦ c ≦ 10 | | 10 ≦ c ≦ 20 |

(b) if 2≦d≦4, the values for a, b and c are grouped as follows,

| | | |
|---|---|---|
| 57 ≦ a ≦ 76 | or | 45 ≦ a ≦ 60 |
| 0 ≦ b ≦ 10 | | 10 ≦ b ≦ 13 |
| 0 ≦ c ≦ 6 | | 6 ≦ c ≦ 15 |

(iv) when 23≦(e+f)≦26, with 5≦[c]*e*≦26 and 0≦f≦20, then (a) if 0≦d≦2, the values for a, b and c are grouped as follows, 54≦23 a≦75

0≦b≦10

0≦c≦8

(v) up the 6 atom percent of the Ni and X component present being, optionally, replaced by Mn; and (vi) up to 2 atom percent of the combined B and Si present being, optionally, replaced by at least one of C, Ge and Al.

The marker is capable of producing magnetic fields at frequencies which are harmonics of the frequency of an incident field. Such frequencies have selected tones that provide the marker with signal identity. A detecting means 20 is arranged to detect magnetic field variations at selected tones of the harmonics produced in the vicinity of the interrogation zone 12 by the presence of marker 16 therewithin. Typically, the system 10 includes a pair of coil units 22, 24 disposed on opposing sides of a path leading to the exit 26 of a store. Detection circuitry, including an alarm 28, is housed within a cabinet 30 located near the exit 26. Articles of merchandise 19 such as wearing apparel, appliances, books and the like are displayed within the store. Each of the articles 19 has secured thereto a marker 16 constructed in accordance with the present invention. The marker 16 includes an elongated, ductile amorphous, ferromagnetic, near-zero magnetostrictive strip 18 that is normally in an activated mode. When marker 16 is in the activated mode, placement of an article 19 between coil units 22 and 24 of interrogation zone 12 will cause an alarm to be emitted from cabinet 30. In this manner, the system 10 prevents unauthorized removal of aritcles of merchandise 19 from the store.

Disposed on a checkout counter near cash register 36 is a aleactivator system 38. The latter is electrically connected to cash register 36 by wire 40. Articles 19 that have been properly paid for are placed within an aperture 42 of aleactivation system 38, whereupon a magnetic field similar to that produced by coil units 22 and 24 of interrogation zone 12 is applied to marker 16. The deactivation system 38 has detection circuitry adapted to activate a gaussing circuit in response to harmonic signals generated by marker 16. The gaussing circuit applies to marker 16 a high magnetic field that places the marker 16 in a deactivated mode. The article 19 carrying the deactivated marker 16 may then be carried through interrogation zone 12 without triggering the alarm 28 in cabinet 30.

The theft detection system circuitry with which the marker 16 is associated can be any system capable of (1) generating within an interrogation zone an incident magnetic field, and (2) detecting magnetic field variations at selected harmonic frequencies produced in the vicinity of the interrogation zone by the presence of the marker therewithin. Such systems typically include means for transmitting a varying electrical current from an oscillator and amplifier through conductive coils that form a frame antenna capable of developing a varying magnetic field. An example of such antenna arrangement is disclosed in French patent No. 763,681, published May 4, 1934, which description is incorporated herein by reference thereto.

In accordance with a preferred embodiment of the invention, an amorphous ferromagnetic metal marker is provided. The marker is in the form of an elongated, ductile strip having a value of magnetostriction near zero and a composition consisting essentially of the formula $Co_aFe_bNi_cX_dB_eSi_f$ where X is at least one of Cr, Mo and Nb a–f are in atom percent and the following provisos are applicable:

(i) when 14≦(e+f)≦17, with 10≦e≦17 and 0≦f≦7, then (a) if 2≦d≦4, the values for a, b and c are grouped as follows,

| | | |
|---|---|---|
| 44 ≦ a ≦ 84 | or | 31 ≦ a ≦ 64 |
| 0 ≦ b ≦ 10 | | 10 ≦ b ≦ 18 |
| 0 ≦ c ≦ 10 | | 10 ≦ c ≦ 30 |

(b) if 4≦d≦6, the values for a, b and c are grouped as follows,

| | | |
|---|---|---|
| 57 ≦ a ≦ 87 | or | 41 ≦ a ≦ 62 |
| 0 ≦ b ≦ 10 | | 10 ≦ b ≦ 16 |
| 0 ≦ c ≦ 10 | | 10 ≦ c ≦ 20 |

(c) if 6≦d≦8, the values for a, b and c are grouped as follows,

| | | |
|---|---|---|
| 61 ≦ a ≦ 80 | or | 46 ≦ a ≦ 86 |
| 0 ≦ b ≦ 10 | | 10 ≦ b ≦ 14 |
| 0 ≦ c ≦ 4 | | 4 ≦ c ≦ 15 |

(ii) when 17≦(e+f)≦20, with 12≦e≦20 and 0≦f≦8, then (a) if 0≦d≦2, the values for a, b and c are grouped as follows,

| | | |
|---|---|---|
| 58 ≦ a ≦ 83 | or | 30 ≦ a ≦ 63 |
| 0 ≦ b ≦ 10 | | 10 ≦ b ≦ 17 |
| 0 ≦ c ≦ 10 | | 10 ≦ c ≦ 38 |

(b) if 2≦d≦4, the values for a, b and c are grouped as follows,

| | | |
|---|---|---|
| $56 \leqq a \leqq 81$<br>$0 \leqq b \leqq 10$<br>$0 \leqq c \leqq 10$ | or | $41 \leqq a \leqq 61$<br>$10 \leqq b \leqq 15$<br>$10 \leqq c \leqq 20$ |

(c) if $4 \leqq d \leqq 6$, the values for a, b and c are grouped as follows,

| | | |
|---|---|---|
| $59 \leqq a \leqq 79$<br>$0 \leqq b \leqq 10$<br>$0 \leqq c \leqq 5$ | or | $51 \leqq a \leqq 64$<br>$10 \leqq b \leqq 13$<br>$5 \leqq c \leqq 10$ |

(iii) when $20 \leqq (e+f) \leqq 23$, with $8 \leqq e \leqq 23$ and $0 \leqq f \leqq 15$, then (a) if $0 \leqq d \leqq 2$, the values for a, b and c are grouped as follows,

| | | |
|---|---|---|
| $55 \leqq a \leqq 78$<br>$0 \leqq b \leqq 10$<br>$0 \leqq c \leqq 10$ | or | $40 \leqq a \leqq 58$<br>$10 \leqq b \leqq 15$<br>$10 \leqq c \leqq 20$ |

(b) $2 \leqq d \leqq 4$, then values for a, b and c are grouped as follows,

| | | |
|---|---|---|
| $57 \leqq a \leqq 76$<br>$0 \leqq b \leqq 10$<br>$0 \leqq c \leqq 6$ | or | $45 \leqq a \leqq 60$<br>$10 \leqq b \leqq 13$<br>$6 \leqq c \leqq 15$ |

(iv) when $23 \leqq (e+f) \leqq 26$, with $5 \leqq$ [c]$e \leqq 26$ and $0 \leqq f \leqq 20$, then (a) if $0 \leqq d \leqq 2$, the values for a, b and c are grouped as follows, $54 \leqq a \leqq 75$ $0 \leqq b \leqq 10$ $0 \leqq c \leqq 8$ (v) up to 6 atom percent of the Ni and X component present being, optionally, replaced by at least one of C, Ge and Al.

The marker is capable of producing magnetic fields at frequencies which are harmonics of the frequency of an incident field.

Examples of amorphous ferromagnetic marker compositions within the scope of the invention are set forth in Tables I–III below:

Table I shows examples of glassy alloy based on Co-Fe-B, Co-Fe-B-Si, Co-Fe-Ni-B, Co-Fe-Ni-B-Si and Co-Fe-Ni-Mo-B-Si having a saturation induction ($B_s$) above 0.6T, curie temperature ($\theta_f$) above 500K and a saturation magnetostriction ($\lambda_f$) ranging from $-4\times10^{-6}$ to $2.5\times10^{-6}$.

TABLE I

| Compositions (atom percent) | | | | | | | | |
|---|---|---|---|---|---|---|---|---|
| Co | Fe | Ni | Mo | B | Si | $B_c$ (Tesla) | $\theta_f$(K) | $\lambda_c(10^{-6})$ |
| 67.4 | 4.1 | 3.0 | 1.5 | 12.5 | 11.5 | 0.72 | 603 | 0.0 |
| 67.1 | 4.4 | 3.0 | 1.5 | 12.5 | 11.5 | 0.75 | 626 | 0.0 |
| 64.0 | 4.5 | 6.0 | 1.5 | 12.5 | 11.5 | 0.70 | 620 | 0.0 |
| 65.5 | 4.5 | 4.5 | 1.5 | 12.5 | 11.5 | 0.74 | 620 | −0.8 |
| 70.0 | 4.5 | 0 | 1.5 | 12.5 | 11.5 | 0.77 | 649 | −0.8 |
| 69.0 | 4.1 | 1.4 | 1.5 | 12 | 12 | 0.75 | 615 | 0.0 |
| 68.5 | 4.5 | 1.5 | 1.5 | 12.5 | 11.5 | 0.78 | 639 | −0.9 |
| 63.3 | 3.7 | 7.5 | 1.5 | 12.5 | 11.5 | 0.66 | 575 | −0.7 |
| 67.0 | 4.5 | 3.0 | 1.5 | 11 | 13 | 0.72 | 582 | −0.4 |
| 67.0 | 4.5 | 3.0 | 1.5 | 12 | 12 | 0.70 | 598 | 0.0 |
| 67.0 | 4.5 | 3.0 | 1.5 | 13 | 11 | 0.74 | 654 | 0.0 |
| 67.0 | 4.5 | 3.0 | 1.5 | 14 | 10 | 0.74 | 637 | −0.4 |
| 67.8 | 3.7 | 3.0 | 1.5 | 11 | 13 | 0.70 | 558 | −0.4 |
| 67.8 | 3.7 | 3.0 | 1.5 | 12 | 12 | 0.70 | 585 | −0.2 |
| 67.8 | 3.7 | 3.0 | 1.5 | 13 | 11 | 0.70 | 600 | −0.4 |
| 67.8 | 3.7 | 3.0 | 1.5 | 14 | 10 | 0.72 | 623 | −0.6 |
| 67.8 | 3.7 | 3.0 | 1.5 | 15 | 9 | 0.72 | 640 | −0.6 |
| 66.3 | 5.2 | 3.0 | 1.5 | 12 | 12 | 0.72 | 586 | −0.6 |
| 68.5 | 3.0 | 3.0 | 1.5 | 12 | 12 | 0.70 | 609 | −0.3 |
| 69.3 | 2.2 | 3.0 | 1.5 | 12 | 12 | 0.70 | 580 | −1.1 |
| 67.5 | 4.5 | 3.0 | 1.0 | 12 | 12 | 0.75 | 672 | 0.0 |
| 66.6 | 4.4 | 3.0 | 2.0 | 12 | 12 | 0.69 | 610 | −0.6 |
| 68.0 | 3.0 | 3.0 | 2.0 | 12 | 12 | 0.68 | 567 | −0.8 |
| 62.2 | 5.9 | 5.9 | 2.0 | 12 | 12 | 0.69 | 578 | −1.1 |
| 63.6 | 5.9 | 4.4 | 2.0 | 12 | 12 | 0.65 | 563 | −0.8 |
| 65.1 | 5.9 | 3.0 | 2.0 | 12 | 12 | 0.68 | 549 | −0.8 |
| 66.6 | 5.9 | 1.5 | 2.0 | 12 | 12 | 0.71 | 581 | −1.1 |
| 63.0 | 6.0 | 6.0 | 2.0 | 12 | 11 | 0.71 | 673 | −0.2 |
| 67.1 | 5.4 | 0 | 2.0 | 12.5 | 13 | 0.72 | 643 | −0.6 |
| 58.4 | 7.3 | 7.3 | 2.0 | 13 | 12 | 0.62 | 570 | −0.7 |
| 69.5 | 4.1 | 1.4 | 0 | 12 | 13 | 0.79 | 645 | −0.7 |
| 64.0 | 8.0 | 8.0 | 2.0 | 10 | 8 | 0.97 | 725 | −2.5 |
| 64.0 | 8.0 | 8.0 | 2.0 | 12 | 6 | 0.95 | 735 | −1.7 |
| 60.0 | 7.5 | 7.5 | 2.0 | 19 | 4 | 0.83 | 715 | −1.6 |
| 80 | 0 | 0 | 0 | 20 | 0 | 1.15 | 765 | −4.0 |
| 73.6 | 6.4 | 0 | 0 | 20 | 0 | 1.18 | >750 | 0.0 |
| 69.4 | 5.6 | 0 | 0 | 25 | 0 | 1.00 | 760 | 0.0 |
| 70.5 | 4.5 | 0 | 0 | 25 | 0 | 0.96 | 686 | −0.5 |
| 70.5 | 4.5 | 0 | 0 | 6 | 19 | 0.74 | 594 | −0.2 |
| 70.5 | 4.4 | 0 | 0 | 23 | 2 | 0.88 | 745 | −1.7 |
| 69.4 | 5.6 | 0 | 2 | 15 | 10 | 0.72 | 609 | −0.5 |
| 68.7 | 4.3 | 0 | 2 | 11 | 14 | 0.67 | 565 | −0.8 |
| 68.7 | 4.3 | 0 | 2 | 5 | 20 | 0.60 | 502 | −0.3 |
| 56 | 8 | 16 | 0 | 20 | 0 | 0.98 | >750 | −1.0 |
| 34 | 12 | 34 | 0 | 20 | 0 | 0.81 | 630 | −1.2 |

Table II shows examples of glassy Co-Fe-B base alloy containing Ni, Mn, Mo, Si, C and Ge. One of the advantages of Mn addition is the high value of the saturation induction approaching about 1.25 Tesla.

TABLE II

Saturation induction ($B_s$). Curie temperature ($\theta_f$) and saturation mangetostriction ($\lambda_s$) of near-zero magnetiostrictive glassy alloys.

| compositions | | | | | | | | | | | |
|---|---|---|---|---|---|---|---|---|---|---|---|
| Co | Fe | Ni | Mn | Mo | B | Si | C | Ge | $B_c$(Tesla) | $\theta_f$(K) | $\lambda_c(10^{-6})$ |
| 65.7 | 4.4 | 2.9 | 0 | 2 | 24 | 0 | 1 | 0 | 0.74 | 666 | −0.8 |

TABLE II-continued

Saturation induction ($B_s$). Curie temperature ($\theta_f$) and saturation mangetostriction ($\lambda_s$) of near-zero magnetiostrictive glassy alloys.

| compositions | | | | | | | | | | | |
|---|---|---|---|---|---|---|---|---|---|---|---|
| Co | Fe | Ni | Mn | Mo | B | Si | C | Ge | $B_s$(Tesla) | $\theta_f$(K) | $\lambda_s(10^{-6})$ |
| 65.7 | 4.4 | 2.9 | 0 | 2 | 23 | 0 | 2 | 0 | 0.76 | 666 | 0.0 |
| 65.7 | 4.4 | 2.9 | 0 | 2 | 24 | 0 | 0 | 1 | 0.79 | 649 | −0.4 |
| 65.7 | 4.4 | 2.9 | 0 | 2 | 23 | 0 | 0 | 2 | 0.78 | 654 | −1.1 |
| 68.6 | 4.4 | 0 | 0 | 2 | 24 | 0 | 0 | 1 | 0.99 | 724 | −0.4 |
| 70.5 | 4.5 | 0 | 0 | 0 | 23 | 0 | 0 | 2 | 0.98 | 759 | −0.9 |
| 82 | 2 | 0 | 2 | 0 | 14 | 0 | 0 | 0 | 1.15 | 675 | −0.5 |
| 66.4 | 8.3 | 8.3 | 3 | 0 | 14 | 0 | 0 | 0 | 1.17 | 679 | −2.1 |
| 76.1 | 2.0 | 0 | 4 | 0 | 11 | 5 | 2 | 0 | 1.21 | 685 | −0.9 |
| 73 | 2 | 0 | 5 | 0 | 17 | 3 | 0 | 0 | 1.12 | 684 | 0.0 |
| 65.2 | 3.8 | 0 | 6 | 0 | 8 | 17 | 0 | 0 | 0.72 | 507 | −0.9 |
| 76 | 2 | 0 | 4 | 0.5 | 12.5 | 5 | 0 | 0 | 1.16 | 681 | 0.0 |

Table III shows examples of near zero magnetostrictive glassy alloys containing at least one of Nb, Cr, Mn, Ge and Al.

TABLE III

| Compositions | $B_s$(Tesla) | $\theta_f$(K) | $\lambda_s(10^{-6})$ |
|---|---|---|---|
| $Co_{66}Fe_{4.5}Mn_4Nb_{1.5}B_{15}Si_{10}$ | 0.72 | 437 | −1.5 |
| $Co_{72.1}Fe_{5.9}Cr_2B_{15}Si_5$ | 1.00 | 692 | −0.2 |
| $Co_{70.1}Fe_{1.7}Cr_4B_{14}Si_5$ | 0.90 | 667 | −0.5 |
| $Co_{76}Fe_2Mn_4Al_{0.5}B_{12.5}Si_5$ | 1.22 | 713 | −3.2 |
| $Co_{76}Fe_2Mn_4Be_{0.5}B_{12.5}Si_5$ | 1.17 | 667 | −0.8 |

Examples of amorphous metallic alloy that have been found unsuitable, due to their large magnetostriction values, for use as a magnetic theft detection system marker are set forth in Table IV below:

TABLE IV

| composition | $\lambda_s(10^{-6})$ |
|---|---|
| $Fe_{82}B_{12}Si_6$ | 31 |
| $Fe_{78}B_{13}Si_9$ | 30 |
| $Fe_{81}B_{13.5}Si_{3.5}C_2$ | 31 |
| $Fe_{67}Co_{18}B_{14}Si_1$ | 35 |

The amorphous ferromagnetic metal marker of the vention is prepared by cooling a melt of the desired composition at a rate of at least about $10^{5°}$ C./sec, employing metal alloy quenching techniques well known to the glassy metal alloy art; see, e.g., U.S. Pat. No. 3,856,513 to Chen et al. The purity of all compositions is that found in normal commercial practice.

A variety of techniques are available for fabricating continuous ribbon, wire, sheet, etc. Typically, a particular composition is selected, powders or granules of the equisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long-range order. X-ray diffraction patterns of glassy metal alloys show only a diffuse halo, similar to that observed for inorganic oxide glasses. Such glassy alloys must be at least 50% glassy to be sufficiently ductile to permit sabsequent handling, such as stamping complex marker shapes from ribbons of the alloys without degradation of the marker's signal identity. Preferably, the glassy metal marker must be at least 80% glassy to attain superior ductility.

The metastable phase may also be a solid solution of the constituent elements. In the case of the marker of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The marker of the invention is advantageously produced in foil (or ribbon) form, and may be used in theft detection applications as cast, whether the material is glassy or a solid solution. Alternatively, foils of glassy metal alloys may be heat treated to obtain a crystalline phase, preferably fine-grained, in order to promote longer die life when stamping of complex marker shapes is contemplated. Markers having partially crystalline, partially glassy phases are particularly suited to be desensitized by a deactivation system 38 of the type shown in FIG. 2, Totally amorphous ferromagnetic marker strips can be provided with one or more small magnetizable elements 44. Such elements 44 are made of crystalline regions of ferromagnetic material having a higher coercivity than that possessed by the strip 18. Moreover, totally amorphous marker strip can be spot welded, heat treated with coherent or incoherent radiation, charged particle beams, directed flames, heated wires or the like to provide the strip with magnetizable elements 44 that are integral therewith. Further, such elements 44 can be integrated with strip 18 during casting thereof by selectively altering the cooling rate of the strip 18. Cooling rate alteration can be effected by quenching the alloy on a chill surface that is slotted or contains heated portions adapted to allow partial crystallization during quenching. Alternatively, alloys can be selected that partially crystallize during casting. The ribbon thickness can be varied during casting to produce crystalline regions over a portion of strip 18.

In order to obtain best harmonic response from a magnetic alloy, it is important that the alloy's B-H loop be as square as possible. Any shear-type distortion of the alloy's B-H loop will result in diminished harmonic output.

As a result of the extremely large quench rates required to fabricate magnetic metallic glasses, large internal stress are left in the alloy. In alloys with magnetostriction, these internal stress affect the shape of the B-H loop. Internal stresses can be reduced or eliminated by heat treatment, but this also tends to embrittle the alloy. Heat treating can therefore render a B-H loop undistorted by internal stress, but with the undesirable loss of bend ductility. External mehanical stress (i.e., bending, flexing, twisting) will also distort the B-H loop of a magnetorestrictive alloy, whether heat treated or not.

The use of near zero magnetostriction alloys will greatly diminish or eliminate the link between stress and magnetic properties. Since internal stress have little or no effect on magnetic properties in near zero magnetostriction alloys, the B-H loop of such alloys is more square than that of a magnetostrictive alloy having a larger value of magnetostriction. In other words, for any two as-cast alloys having the same internal stresses, the probability that the near zero magnetstrictive alloy will have a squarer B-H loop than the more magnetostrictive alloy is greater. In addition, the magnetic properties of near zero magnetostrictive alloys are substantially uneffected by external stress (i.e., mild bending, flexing, twisting). Alloys in which the magnetostriction value ranges from about $+4\times10^{-6}$ to $-4\times10^{\times6}$, and preferably from about $+2\times10^{-6}$ to $-2\times10^{-6}$, squareness of which makes the alloys especially suited for use as targets for the antipilferage systems of the present invention. Accordingly, alloys having such magnetostrictive values are preferred.

The signal retention capability of the marker 16 is an inverse function of the saturation magnetostriction of strip 18. As the magnetostriction of the strip 18 approaches zero, the magnitude of the stresses to which the marker 16 can be subjected without loss of signal retention approaches the yield strength of the strip 18. That magnitude is highest for markers 16 having magnetostriction values at zero. Accordingly, marker 16 wherein the absolute value of magnetostriction of strip 18 is zero are especially preferred.

Upon permanent magnetization of the elements 44, their permeability is substantially decreased. The magnetic fields associated with such magnetization bias the strip 18 and thereby alter its response to the magnetic field extant in the interrogation zone 12. In the activated mode, the strip 18 is unbiased with the result that the high permeability state of strip 18 has a pronounced effect upon the magnetic field applied thereto by field generating means 14. The marker 16 is deactivated by magnetizing elements 44 to decrease the effective permeability of the strip 18. The reduction in permeability significantly decreases the effect of the marker 16 on the magnetic field, whereby the marker 16 loses its signal identity (e.g., marker 16 is less able to distort or reshape the field). Under these conditions, the protected articles 19 can pass through interrogation zone 12 without triggering alarm 28.

The amorphous ferromagnetic marker of the present invention is exceedingly ductile. By ductile is meant that the strip 18 can be bent to a round radius as small as ten times the foil thickness without fracture. Such bending of the marker produces little or no degradation in magnetic harmonics generated by the marker upon application of the interrogating magnetic field thereto. As a result, the marker retains its signal identity despite being flexed or bent during (1) manufacture (e.g., cutting, stamping or otherwise forming strip 18 into the desired length and configuration) and, optionally, applying hard magnetic chips thereto to produce an on/off marker, (2) application of the marker 16 to the protected articles 19, (3) handling of the articles 19 by employees and customers and (4) attempts at signal destruction designed to circumvent the system 10. Moreover, the signal identity of the marker 16 is, surprisingly, retained even though the marker is left in the stressed condition after bending or flexure occurs.

Generation of harmonics by marker 16 is caused by nonlinear magnetization response of the marker 16 to an incident magnetic field. High permeability—low coercive force material such as Permalloy, Supermalloy and the like produce such nonlinear response in an amplitude region of the incident field wherein the magnetic field strength is sufficiently great to saturate the material. Amorphous ferromagnetic materials have nonlinear magnetization response over a significantly greater amplitude region ranging from relatively low magnetic fields to higher magnetic field values approaching saturation. The additional amplitude region of nonlinear magnetization response possessed by amorphous retromagnetic materials increases the magnitude of harmonics generated by, and hence the signal strength of, marker 16. This feature permits use of lower magnetic fields, eliminates false alarms and improves detection reliability of the system 10.

The following examples are presented to provide a more complete understanding of the invention. The specific techniques, conditions, materials and reported data set forth to illustrate the principles and practice of the invention are exemplary and should not be construed as limiting the scope of the invention.

EXAMPLE I

Elongated strips of amorphous ferromagnetic material were tested in Loss Prevention Systems Antipilferage System #123. The composition and magnetostriction property of the strips, each of which had a thickness of 35 μm, a length of 10 cm and a width 0.3 cm, were as follows:

| Strip # | Composition (Atom %) | Magnetostriction |
|---|---|---|
| 1 | $Co_{80}B_{20}$ | near zero |
| 2 | $Co_{64}Fe_8Ni_8Mo_2B_{12}Si_6$ | near zero |
| 3 | $Co_{64}Fe_8Ni_8Mo_2B_{10}Si_8$ | near zero |
| 4 | $Co_{66.4}Fe_{8.3}Ni_{8.3}Mn_3B_{14}$ | near zero |
| 5 | $Co_{72.1}Fe_{5.9}Cr_2B_{14}Si_5$ | near zero |
| 6 | $Co_{70.3}Fe_{1.7}Cr_4B_{15}Si_5$ | near zero |
| 7 | $Co_{66}Fe_{5.9}Ni_{1.5}Mo_2B_{12}Si_{12}$ | near zero |
| 8 | $Co_{68.7}Fe_{4.3}Mo_2B_{11}Si_{14}$ | near zero |
| 9 | $Co_{70.5}Fe_{4.5}B_{25}$ | near zero |
| 10 | $Co_{70.5}Fe_{4.5}B_{23}Si_2$ | near zero |
| 11 | $Co_{65.7}Fe_{4.4}Ni_{2.9}Mo_2B_{23}C_2$ | near zero |
| 12 | $Co_{69.9}Fe_{4.1}Mn_1B_8Si_{17}$ | near zero |
| 13 | $Co_{69}Fe_{4.1}Ni_{1.4}Mo_{1.5}B_{12}Si_2$ | near zero |
| 14 | $Fe_{67}Co_{18}B_{14}Si_1$ | $>10\times10^{-6}$ |
| 15 | $Fe_{40}Ni_{40}Mo_2B_{18}$ | $>10\times10^{-6}$ |

The Loss Prevention Systems antipilferage system applied, within an interrogation zone 12, a magnetic field that increased from 1.2 Oersted at the center of the zone to 4.0 Oersted in the vicinity of interior walls of the zone. The security system was operated at a frequency of 2.5 kHz. Each of strips 1–15 were twice passed through the security system interrogation zone parallel to the walls thereof. The strips were then flexed by imposing thereon 1.5 turns per 10 cm of length to produce a stressed condition and passed through the interrogation zone 12 under stress, The results of the example are tabulated below.

TABLE V

| Strip # | Condition of Material | Activated Alarm |
|---|---|---|
| 1 | before flexure | yes |
| | during stress | yes |
| 2 | before flexure | yes |
| | during stress | yes |
| 3 | before flexure | yes |
| | during stress | yes |

TABLE V-continued

| Strip # | Condition of Material | Activated Alarm |
|---|---|---|
| 4 | before flexure | yes |
| | during stress | yes |
| 5 | before flexure | yes |
| | during stress | yes |
| 6 | before flexure | yes |
| | during stress | yes |
| 7 | before flexure | yes |
| | during stress | yes |
| 8 | before flexure | yes |
| | during stress | yes |
| 9 | before flexure | yes |
| | during stress | yes |
| 10 | before flexure | yes |
| | during stress | yes |
| 11 | before flexure | yes |
| | during stress | yes |
| 12 | before flexure | yes |
| | during stress | yes |
| 13 | before flexure | yes |
| | during stress | yes |
| 14 | before flexure | yes |
| | during stress | no |
| 15 | before flexure | yes |
| | during stress | no |

EXAMPLE II

Figure 5:
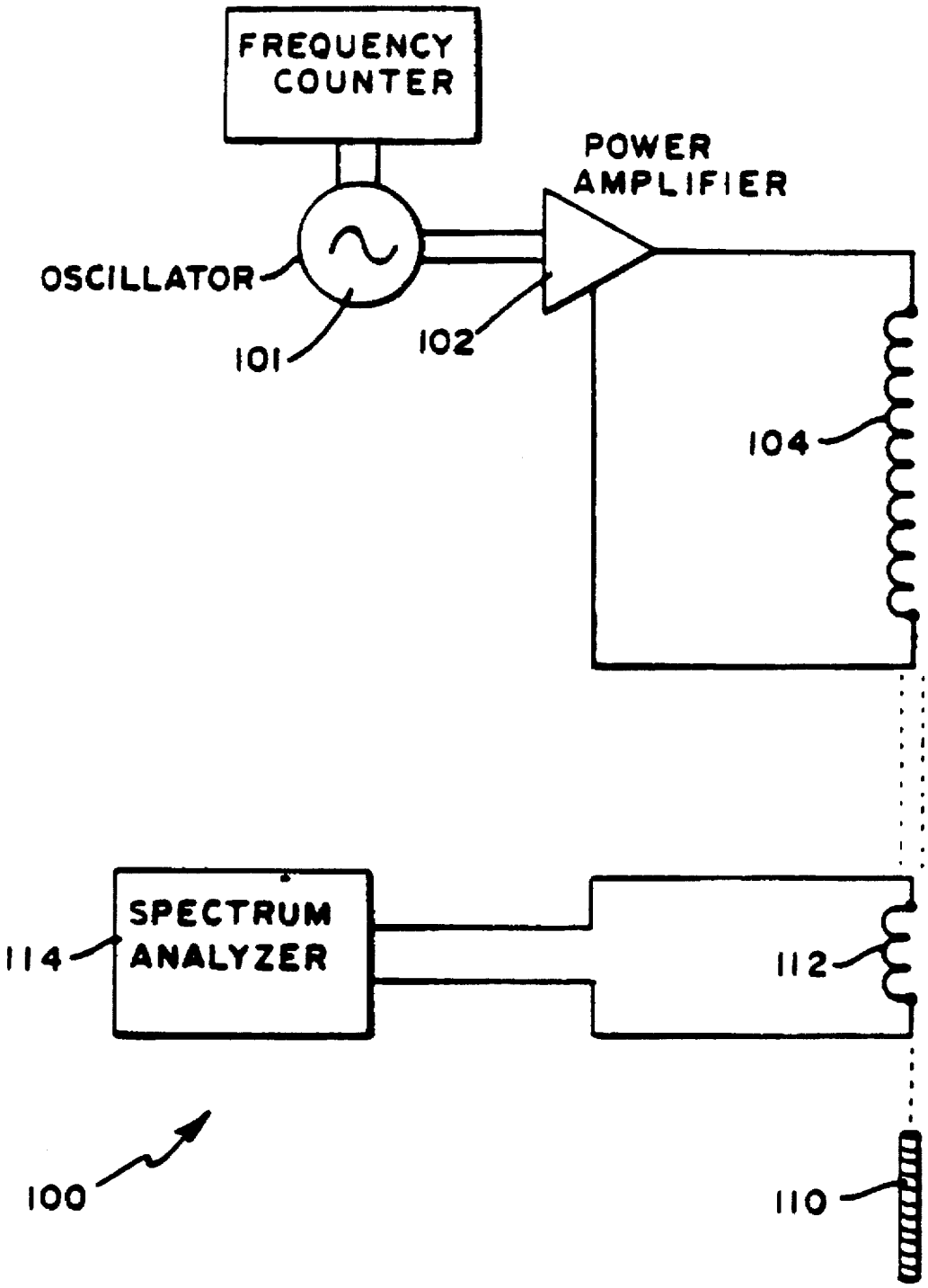
FIG. 5 is a schematic electrical diagram of a harmonic signal amplitude test apparatus used to measure the signal retention capability of the amorphous ferromagnetic metal marker of this invention.

In order to demonstrate quantitatively the signal retention capability of the amorphous antipilferage marker of the invention, elongated strips composed of ferremagnetic amorphous materials were prepared. The strips were evaluated to determine their signal strength before and after flexure using a harmonic signal amplitute test apparatus 100. A schematic electrical diagram of the test apparatus 100 is shown in FIG. 5. The apparatus 100 had an oscillator generator 101 for generating a sinusoidal signal at a frequency of 2.5 KHz. Oscillator generator 101 drove a power amplifier 102 connected in series with an applied field coil 104. The current output of amplifier 102 was adjusted to produce a magnetic field of 0.1 Oerstead within applied field coil 104. There was no applied d-c field, and the coil 104 was oriented perpendicular to the earth's magnetic field. Applied field coil 104 was constructed of 121 turns of closely wrapped, #14 AWG, insulated copper wire. Coil 104 had an inside diameter of 8 cm and was 45.7 cm long. Pick-up coil 112 was constructed of 50 turns of closely wrapped #26 AWG, insulated copper wire. The coil 112 had an inside diameter of 5.0 cm. and was 5.0 cm. long. A sample marker 110 was placed in pick-up coil 112, which is coxially disposed inside the applied field coil 104. The voltage generated by the pick up coil 112 was fed into a spectrum analyzer 114. The amplitude of harmonic response by the sample marker 110 was measured with the spectrum analyzer 114 and indicated on a CRT.

The harmonic generation test apparatus 100 was used to test marker samples composed of materials identified in Example I. Each of the samples, numbered 1–5 in Example I was 10 cm. long. The samples were placed inside pickup coil 112 and applied field coil 104 and the amplitude of the 25th harmonic for each sample 110 was observed. Thereafter the samples were attached to helically shaped lucite forms twisted along their length to produce a stressed condition, and placed under stress in pickup coil 112 and applied field coil 104, as before, to observe the amplitude of the 25th harmonic produced thereby. The harmonic signal amplitude retention capability of the samples is set forth below in Table VI.

TABLE VI

| | Signal/noise (dB) of 25th harmonic* | | |
|---|---|---|---|
| Sample | before twist | twist of ½ turn/inch | twist of ⅜ turn/inch |
| 1 | 5 | 4 | 3 |
| 2 | 12 | 10 | 9 |
| 13 | 8 | 6 | 5 |
| 14 | 12 | 0 | 0 |
| 15 | 13 | 3 | 0 |

*constant noise level

As shown by the data reported in Table VI, the samples composed of amorphous, ferromagnetic material with near zero magnetosfriction, applicant's claims retained 70% of their orginial harmonic amplitude during stress, whereas, the amorphous ferromanetic samples with larger magnetostriction retained less than 20% of the original harmonic amplitude after twisting. Bending stresses, caused by twisting, of greater than $10^7$ dynes/cm$^2$ were enough to disable all but near zero magnetostriction targets.

Having thus described the invention in rather full detail it will be understood that these details need not be strictly adhered to but that further changes and modifications may suggest themselves to one having ordinary skill in the art, all falling within the scope of the invention as defined by the subjoined claims.

What is claimed is:

1. For use in a magnetic theft detection system, a marker adapted to generate magnetic fields at frequencies that are harmonically related to an incident magnetic field applied within an interrogation zone and have selected tones that provide said marker with signal identity, said marker comprising an elongated, ductile strip of amorphous ferromagnetic material having a value of magnetostriction near zero and retaining its signal identity under stress.

2. A marker as recited in claim 1, wherein said value of magnetostricton ranges from about $+4\times10^{-b}$ to $-4\times10^{-b}$ and said material has a saturation induction of at least about 6 k Gauss.

3. A marker as recited in claim 2, wherein said value of magnetostriction ranges from about $+2\times10^{-6}$ to $-2\times10^{-6}$.

4. A marker as recited in claim 1, wherein said strip has a composition consisting essentially of the formula $$Co_aFe_bNi_cX_dB_eSi_f$$

where X is at least one of Cr, Mo and Nb, a–f are in atom percent and the following provisos are applicable:

(i) when $14\leqq(e+f)\leqq17$, with $10\leqq e\leqq17$ and $0\leqq f\leqq7$, then (a) if $2\leqq d\leqq4$, the values for a, b and c are grouped as follows,

| | | |
|---|---|---|
| $44 \leqq a \leqq 84$ | or | $31 \leqq a \leqq 64$ |
| $0 \leqq b \leqq 10$ | | $10 \leqq b \leqq 18$ |
| $0 \leqq c \leqq 10$ | | $10 \leqq c \leqq 30$ |

(b) if $4\leqq d\leqq6$, the values for a, b and c are grouped as follows,

| | | |
|---|---|---|
| 57 ≦ a≦ 87 | or | 41 ≦ a≦ 62 |
| 0 ≦ b ≦ 10 | | 10 ≦ b ≦ 16 |
| 0 ≦ c≦ 10 | | 10 ≦ c≦ 20 |

(c) if 6≦d≦8, the values for a, b and c are grouped as follows,

| | | |
|---|---|---|
| 61 ≦ a≦ 80 | or | 46 ≦ a≦ 66 |
| 0 ≦ b ≦ 10 | | 10 ≦ b ≦ 14 |
| 0 ≦ c≦ 4 | | 4 ≦ c≦ 15 |

(ii) when 17≦(e+f)≦20, with 12≦e≦20 and 0≦f≦8, then (a) if 0≦d≦2, the values for a, b and c are grouped as follows,

| | | |
|---|---|---|
| 58 ≦ a≦ 83 | or | 30 ≦ a≦ 63 |
| 0 ≦ b ≦ 10 | | 10 ≦ b ≦ 17 |
| 0 ≦ c≦ 10 | | 10 ≦ c≦ 38 |

(b) if 2≦d≦4, the values for a, b and c are grouped as follows,

| | | |
|---|---|---|
| 56 ≦ a≦ 81 | or | 41 ≦ a≦ 61 |
| 0 ≦ b ≦ 10 | | 10 ≦ b ≦ 15 |
| 0 ≦ c≦ 10 | | 10 ≦ c≦ 20 |

(c) if 4≦d≦6, the values for a, b and c are grouped as follows,

| | | |
|---|---|---|
| 59 ≦ a≦ 79 | or | 51 ≦ a≦ 64 |
| 0 ≦ b ≦ 10 | | 10 ≦ b ≦ 13 |
| 0 ≦ c≦ 5 | | 5 ≦ c≦ 10 |

(iii) when 20≦(e+f)≦23, with 8≦e≦23 and 0≦f≦15, then (a) if 0≦d≦2, the values for a, b and c are grouped as follows,

| | | |
|---|---|---|
| 55 ≦ a≦ 78 | or | 40 ≦ a≦ 58 |
| 0 ≦ b ≦ 10 | | 10 ≦ b ≦ 15 |
| 0 ≦ c≦ 10 | | 10 ≦ c≦ 20 |

(b) if 2≦d≦4, the values for a, b and c are grouped as follows,

| | | |
|---|---|---|
| 57 ≦ a≦ 76 | or | 45 ≦ a≦ 60 |
| 0 ≦ b ≦ 10 | | 10 ≦ b ≦ 13 |
| 0 ≦ c≦ 6 | | 6 ≦ c≦ 15 |

(iv) when 23≦(e+f)≦26, with 5≦[c]*e*≦26 and 0≦f≦20, then (a) if 0≦d≦2, the values for a, b and c are grouped as follows, 54≦a≦75

0≦b≦10

0≦c≦8

(v) up to 6 atom percent of the Ni and X component present being, optionally, replaced by Mn; and (vi) up to 2 atom percent of the combined B and Si present being, optionally, replaced by at least one of C, Ge and Al.

5. A marker as recited in claim 4, wherein said composition has a curie temperature of at least about 150° C.

6. A marker as recited in claim 1, said marker having at least one magnetizable portion integral therewith, the magnetizable portion having coercivity higher than that of said amorphous material.

7. A marker as recited in claim 6, wherein said magnetizable portion is adapted to be magnetized to bias said strip and thereby decrease the amplitude or the magnetic fields generated by said marker.

8. A marker as recited in claim 7, wherein said decrease in amplitude of magnetic fields generated by said marker causes said marker to lose its signal identity.

9. A marker as recited in claim 6, wherein said magnetizable portion comprises a crystalline region of said material.

10. In a magnetic theft detection system marker for generating magnetic fields at frequencies that are harmonically related to an incident magnetic field applied within an interrogation zone and have selected tones that provide said marker with signal identity, the improvement wherein:

a. said marker comprises an elongated, ductile strip of amorphous ferromagnetic material having a value of magnetostriction near zero; and b. said marker retains its signal identity under stress.

11. A magnetic detection system responsive to the presence of an article within an interrogation zone, comprising:

a. means for defining an interrogation zone;

b. means for generating a magnetic field within said interrogation zone;

c. a marker secured to an article appointed for passage through said interrogation zone, said marker being an elongated, ductile strip of amorphous ferromagnetic metal having a value of magnetostriction near zero and being capable or producing magnetic fields at frequencies which are harmonics of the frequency of an incident field;

d. detecting means for detecting magnetic field variations at selected tones of said harmonics produced in the vicinity of the interrogation zone by the presence of the marker therewithin, said selected tones providing said marker with signal identity and said marker retaining said signal identity under stress.

* * * * *